United States Patent
Rhoads et al.

(10) Patent No.: US 6,728,390 B2
(45) Date of Patent: *Apr. 27, 2004

(54) METHODS AND SYSTEMS USING MULTIPLE WATERMARKS

(75) Inventors: Geoffrey B. Rhoads, West Linn, OR (US); Ammon E. Gustafson, Beaverton, OR (US)

(73) Assignee: Digimarc Corporation, Tualatin, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/012,992

(22) Filed: Dec. 7, 2001

(65) Prior Publication Data

US 2002/0064298 A1 May 30, 2002

Related U.S. Application Data

(62) Division of application No. 09/433,104, filed on Nov. 3, 1999, which is a continuation-in-part of application No. 09/234,780, filed on Jan. 20, 1999, now abandoned, which is a continuation-in-part of application No. 09/442,440, filed on Nov. 17, 1999, now Pat. No. 6,542,618, which is a continuation of application No. 08/951,858, filed on Oct. 16, 1997, now Pat. No. 6,026,193, which is a continuation of application No. 08/436,134, filed on May 8, 1995, now Pat. No. 5,748,763.

(60) Provisional application No. 60/071,983, filed on Jan. 20, 1998.

(51) Int. Cl.[7] .............................. G06K 9/00; H04L 9/00
(52) U.S. Cl. ...................... 382/100; 382/232; 713/176
(58) Field of Search ................................. 382/100, 232, 382/236, 305; 358/1.13; 380/28, 54; 705/1; 707/101; 709/217; 713/176

(56) References Cited

U.S. PATENT DOCUMENTS

| | | |
|---|---|---|
| 3,493,674 A | 2/1970 | Houghton |
| 3,569,619 A | 3/1971 | Simjian ........................ 235/380 |
| 3,576,369 A | 4/1971 | Wick et al. |

(List continued on next page.)

FOREIGN PATENT DOCUMENTS

| | | |
|---|---|---|
| CA | 2235002 | 12/1998 |

(List continued on next page.)

OTHER PUBLICATIONS

Cross et al., "Watermaking For Self–Authentication Of Compressed Video", Motorola Corporation, IEEE Jun. 2002, pp. 913–916.*

(List continued on next page.)

Primary Examiner—Jayanti K. Patel
(74) Attorney, Agent, or Firm—Steven W. Stewart; Digimarc Corporation

(57) ABSTRACT

Two or more digital watermarks, with different characteristics, are embedded in a document. The characteristics are chosen so that the watermarks will be affected in different manners if the document is subsequently copied or reproduced. The detection process or mechanism reads two or more of the watermarks and compares their characteristics. While wear and handling may change the characteristics of the digital watermarks in a document, the relationship between the characteristics of the multiple digital watermarks in a document will nevertheless give an indication as to whether a document is an original or a copy of an original. Document wear can be independently assessed and used as an aid in interpreting the detected watermark characteristics.

19 Claims, 4 Drawing Sheets

U.S. PATENT DOCUMENTS

| | | | |
|---|---|---|---|
| 3,585,290 A | 6/1971 | Sanford | |
| 3,655,162 A | 4/1972 | Yamamoto et al. | |
| 3,703,628 A | 11/1972 | Philipson, Jr. | |
| 3,809,806 A | 5/1974 | Walker et al. | |
| 3,838,444 A | 9/1974 | Loughlin et al. | |
| 3,914,877 A | 10/1975 | Hines | |
| 3,922,074 A | 11/1975 | Ikegami et al. | |
| 3,971,917 A | 7/1976 | Maddox et al. | |
| 3,977,785 A | 8/1976 | Harris | |
| 3,982,064 A | 9/1976 | Barnaby | |
| 3,984,624 A | 10/1976 | Waggener | 348/473 |
| 4,025,851 A | 5/1977 | Haselwood et al. | |
| 4,184,700 A | 1/1980 | Greenaway | |
| 4,225,967 A | 9/1980 | Miwa et al. | |
| 4,230,990 A | 10/1980 | Lert, Jr. et al. | 725/22 |
| 4,231,113 A | 10/1980 | Blasbalg | |
| 4,238,849 A | 12/1980 | Gassmann | 370/204 |
| 4,252,995 A | 2/1981 | Schmidt et al. | |
| 4,262,329 A | 4/1981 | Bright et al. | |
| 4,296,326 A | 10/1981 | Haslop et al. | 283/70 |
| 4,297,729 A | 10/1981 | Steynor et al. | 360/40 |
| 4,313,197 A | 1/1982 | Maxemchuk | 370/210 |
| 4,367,488 A | 1/1983 | Leventer et al. | 348/467 |
| 4,379,947 A | 4/1983 | Warner | 370/204 |
| 4,380,027 A | 4/1983 | Leventer et al. | 348/467 |
| 4,389,671 A | 6/1983 | Posner et al. | |
| 4,395,600 A | 7/1983 | Lundy et al. | 381/73.1 |
| 4,416,001 A | 11/1983 | Ackerman | |
| 4,423,415 A | 12/1983 | Goldman | |
| 4,425,642 A | 1/1984 | Moses et al. | 370/477 |
| 4,476,468 A | 10/1984 | Goldman | |
| 4,528,588 A | 7/1985 | Löfberg | 340/5.1 |
| 4,532,508 A | 7/1985 | Ruell | |
| 4,547,804 A | 10/1985 | Greenberg | 348/460 |
| 4,553,261 A | 11/1985 | Froessl | |
| 4,590,366 A | 5/1986 | Rothfjell | |
| 4,595,950 A | 6/1986 | Lofberg | |
| 4,618,257 A | 10/1986 | Bayne et al. | 356/171 |
| 4,637,051 A | 1/1987 | Clark | |
| 4,639,779 A | 1/1987 | Greenberg | |
| 4,647,974 A | 3/1987 | Butler et al. | |
| 4,654,867 A | 3/1987 | Labedz et al. | |
| 4,660,221 A | 4/1987 | Dlugos | |
| 4,663,518 A | 5/1987 | Borror et al. | |
| 4,665,431 A | 5/1987 | Cooper | |
| 4,672,605 A | 6/1987 | Hustig et al. | 370/201 |
| 4,675,746 A | 6/1987 | Tetrick et al. | 358/296 |
| 4,677,435 A | 6/1987 | D'Agraives et al. | |
| 4,682,794 A | 7/1987 | Margolin | |
| 4,703,476 A | 10/1987 | Howard | |
| 4,712,103 A | 12/1987 | Gotanda | |
| 4,718,106 A | 1/1988 | Weinblatt | |
| 4,723,072 A | 2/1988 | Naruse | 235/454 |
| 4,723,149 A | 2/1988 | Harada | |
| 4,739,377 A | 4/1988 | Allen | 355/133 |
| 4,750,173 A | 6/1988 | Blüthgen | 370/528 |
| 4,765,656 A | 8/1988 | Becker et al. | |
| 4,775,901 A | 10/1988 | Nakano | |
| 4,776,013 A | 10/1988 | Kafri et al. | |
| 4,805,020 A | 2/1989 | Greenberg | |
| 4,807,031 A | 2/1989 | Broughton et al. | 348/460 |
| 4,811,357 A | 3/1989 | Betts et al. | |
| 4,811,408 A | 3/1989 | Goldman | |
| 4,820,912 A | 4/1989 | Samyn | |
| 4,835,517 A | 5/1989 | van der Gracht et al. | |
| 4,855,827 A | 8/1989 | Best | 348/485 |
| 4,864,618 A | 9/1989 | Wright et al. | |
| 4,866,771 A | 9/1989 | Bain | |
| 4,874,936 A | 10/1989 | Chandler et al. | |
| 4,876,617 A | 10/1989 | Best et al. | |
| 4,879,747 A | 11/1989 | Leighton et al. | 713/186 |
| 4,884,139 A | 11/1989 | Pommier | |
| 4,885,632 A | 12/1989 | Mabey et al. | |
| 4,888,798 A | 12/1989 | Earnest | 705/54 |
| 4,903,301 A | 2/1990 | Kondo et al. | |
| 4,908,836 A | 3/1990 | Rushforth et al. | 375/152 |
| 4,908,873 A | 3/1990 | Philibert et al. | 382/100 |
| 4,918,484 A | 4/1990 | Ujiie et al. | |
| 4,920,503 A | 4/1990 | Cook | |
| 4,921,278 A | 5/1990 | Shiang et al. | |
| 4,939,515 A | 7/1990 | Adelson | |
| 4,941,150 A | 7/1990 | Iwasaki | |
| 4,943,973 A | 7/1990 | Werner | |
| 4,943,976 A | 7/1990 | Ishigaki | |
| 4,944,036 A | 7/1990 | Hyatt | 367/43 |
| 4,947,028 A | 8/1990 | Gorog | 235/380 |
| 4,963,998 A | 10/1990 | Maufe | |
| 4,965,827 A | 10/1990 | McDonald | |
| 4,967,273 A | 10/1990 | Greenberg | |
| 4,969,041 A | 11/1990 | O'Grady et al. | 348/473 |
| 4,972,471 A | 11/1990 | Gross et al. | |
| 4,972,475 A | 11/1990 | Sant'Anselmo | |
| 4,972,476 A | 11/1990 | Nathans | 713/186 |
| 4,977,594 A | 12/1990 | Shear | 705/53 |
| 4,979,210 A | 12/1990 | Nagata et al. | |
| 4,996,530 A | 2/1991 | Hilton | |
| 5,003,590 A | 3/1991 | Lechner et al. | |
| 5,010,405 A | 4/1991 | Schreiber et al. | |
| 5,023,907 A | 6/1991 | Johnson | 710/200 |
| 5,027,401 A | 6/1991 | Soltesz | 380/54 |
| 5,034,982 A | 7/1991 | Heninger et al. | |
| 5,036,513 A | 7/1991 | Greenblatt | |
| 5,040,059 A | 8/1991 | Leberl | 348/135 |
| 5,053,956 A | 10/1991 | Donald | 713/601 |
| 5,062,666 A | 11/1991 | Mowry et al. | 283/67 |
| 5,063,446 A | 11/1991 | Gibson | |
| 5,073,899 A | 12/1991 | Collier et al. | |
| 5,073,925 A | 12/1991 | Nagata et al. | |
| 5,075,773 A | 12/1991 | Pullen et al. | |
| 5,077,608 A | 12/1991 | Dubner | |
| 5,077,795 A | 12/1991 | Rourke et al. | |
| 5,079,648 A | 1/1992 | Maufe | |
| 5,091,966 A | 2/1992 | Bloomberg et al. | |
| 5,095,196 A | 3/1992 | Miyata | 235/382 |
| 5,103,459 A | 4/1992 | Gilhousen et al. | 370/206 |
| 5,113,437 A | 5/1992 | Best | |
| 5,113,445 A | 5/1992 | Wang | 380/51 |
| 5,128,525 A | 7/1992 | Stearns et al. | |
| 5,144,660 A | 9/1992 | Rose | |
| 5,146,457 A | 9/1992 | Veldhuis et al. | 370/523 |
| 5,148,498 A | 9/1992 | Resnikoff et al. | |
| 5,150,409 A | 9/1992 | Elsner | |
| 5,161,210 A | 11/1992 | Druyvesteyn et al. | |
| 5,166,676 A | 11/1992 | Milheiser | |
| 5,168,147 A | 12/1992 | Bloomberg | |
| 5,181,786 A | 1/1993 | Hujink | 400/61 |
| 5,185,736 A | 2/1993 | Tyrrell et al. | |
| 5,199,081 A | 3/1993 | Saito et al. | |
| 5,200,822 A | 4/1993 | Bronfin et al. | 725/22 |
| 5,212,551 A | 5/1993 | Conanan | |
| 5,213,337 A | 5/1993 | Sherman | 463/40 |
| 5,216,724 A | 6/1993 | Suzuki et al. | 382/135 |
| 5,228,056 A | 7/1993 | Schilling | |
| 5,243,411 A | 9/1993 | Shirochi et al. | |
| 5,243,423 A | 9/1993 | DeJean et al. | 348/423 |
| 5,245,165 A | 9/1993 | Zhang | |
| 5,245,329 A | 9/1993 | Gokcebay | |
| 5,247,364 A | 9/1993 | Banker et al. | |
| 5,253,078 A | 10/1993 | Balkanski et al. | |
| 5,257,119 A | 10/1993 | Funada et al. | |
| 5,259,025 A | 11/1993 | Monroe | 705/75 |

| | | | | | | |
|---|---|---|---|---|---|---|
| 5,267,334 A | 11/1993 | Normille et al. | | 5,568,179 A | 10/1996 | Diehl et al. |
| 5,280,537 A | 1/1994 | Sugiyama et al. ........... 370/529 | | 5,568,550 A | 10/1996 | Ur ............... 382/306 |
| 5,284,364 A | 2/1994 | Jain ............... 283/87 | | 5,568,570 A | 10/1996 | Rabbani |
| 5,288,976 A | 2/1994 | Citron ................ 235/375 | | 5,572,010 A | 11/1996 | Petrie |
| 5,291,243 A | 3/1994 | Heckman et al. .............. 399/3 | | 5,572,247 A | 11/1996 | Montgomery |
| 5,293,399 A | 3/1994 | Hefti | | 5,576,532 A | 11/1996 | Hecht |
| 5,295,203 A | 3/1994 | Krause et al. .............. 382/248 | | 5,579,124 A | 11/1996 | Aijala et al. |
| 5,299,019 A | 3/1994 | Pack et al. | | 5,582,103 A | 12/1996 | Tanaka et al. |
| 5,305,400 A | 4/1994 | Butera | | 5,587,743 A | 12/1996 | Montgomery |
| 5,315,098 A | 5/1994 | Tow ............... 235/494 | | 5,590,197 A | 12/1996 | Chen et al. |
| 5,319,453 A | 6/1994 | Copriviza et al. | | 5,594,226 A | 1/1997 | Steger ............... 235/379 |
| 5,319,724 A | 6/1994 | Blonstein et al. | | 5,598,526 A | 1/1997 | Daniel et al. ............... 345/540 |
| 5,319,735 A | 6/1994 | Preuss et al. | | 5,602,920 A | 2/1997 | Bestler et al. |
| 5,321,470 A | 6/1994 | Hasuo et al. ............... 399/366 | | 5,606,609 A | 2/1997 | Houser et al. |
| 5,325,167 A | 6/1994 | Melen | | 5,611,575 A | 3/1997 | Petrie |
| 5,327,237 A | 7/1994 | Gerdes et al. | | 5,613,004 A | 3/1997 | Cooperman et al. ........... 380/28 |
| 5,337,362 A | 8/1994 | Gormish et al. | | 5,613,012 A | 3/1997 | Hoffman et al. |
| 5,349,655 A | 9/1994 | Mann | | 5,614,940 A | 3/1997 | Cobbley et al. |
| 5,351,302 A | 9/1994 | Leighton et al. | | 5,617,119 A | 4/1997 | Briggs et al. ............... 707/100 |
| 5,354,097 A | 10/1994 | Tel ............... 283/72 | | 5,617,148 A | 4/1997 | Montgomery |
| 5,371,792 A | 12/1994 | Asai et al. | | 5,629,770 A | 5/1997 | Brassil |
| 5,374,976 A | 12/1994 | Spannenburg ............... 399/366 | | 5,629,980 A | 5/1997 | Stefik et al. |
| 5,379,345 A | 1/1995 | Greenberg ................ 455/2.01 | | 5,636,292 A | 6/1997 | Rhoads ............... 382/232 |
| 5,387,941 A | 2/1995 | Montgomery et al. | | 5,638,443 A | 6/1997 | Stefik ............... 705/54 |
| 5,394,274 A | 2/1995 | Kahn | | 5,638,446 A | 6/1997 | Rubin |
| 5,396,559 A | 3/1995 | McGrew | | 5,640,193 A | 6/1997 | Wellner ............... 725/100 |
| 5,398,283 A | 3/1995 | Virga | | 5,646,997 A | 7/1997 | Barton ............... 713/176 |
| 5,404,160 A | 4/1995 | Schober et al. | | 5,646,999 A | 7/1997 | Saito ............... 705/54 |
| 5,404,377 A | 4/1995 | Moses | | 5,652,626 A | 7/1997 | Kawakami et al. .......... 348/463 |
| 5,408,542 A | 4/1995 | Callahan | | 5,659,164 A | 8/1997 | Schmid ............... 235/375 |
| 5,416,307 A | 5/1995 | Danek et al. ............... 235/449 | | 5,661,574 A | 8/1997 | Kawana |
| 5,418,853 A | 5/1995 | Kanota et al. | | 5,663,766 A | 9/1997 | Sizer, II ............... 348/473 |
| 5,422,963 A | 6/1995 | Chen et al. | | 5,664,018 A | 9/1997 | Leighton ............... 380/54 |
| 5,422,995 A | 6/1995 | Aoki et al. | | 5,665,951 A | 9/1997 | Newman et al. ............. 235/375 |
| 5,425,100 A | 6/1995 | Thomas et al. | | 5,666,487 A | 9/1997 | Goodman et al. |
| 5,428,606 A | 6/1995 | Moskowitz | | 5,668,636 A | 9/1997 | Beach et al. ............... 358/296 |
| 5,428,607 A | 6/1995 | Hiller et al. ............... 370/352 | | 5,671,282 A | 9/1997 | Wolff et al. ............... 713/179 |
| 5,428,731 A | 6/1995 | Powers ............... 707/501.1 | | 5,673,316 A | 9/1997 | Auerbach et al. ............... 705/51 |
| 5,432,542 A | 7/1995 | Thibadeau et al. | | 5,687,236 A | 11/1997 | Moskowitz et al. ........... 380/28 |
| 5,432,870 A | 7/1995 | Schwartz | | 5,710,636 A | 1/1998 | Curry ............... 358/3.28 |
| 5,446,488 A | 8/1995 | Vogel | | 5,719,939 A | 2/1998 | Tel ............... 713/179 |
| 5,450,122 A | 9/1995 | Keene | | 5,721,788 A | 2/1998 | Powell et al. ............... 382/100 |
| 5,450,490 A | 9/1995 | Jensen et al. | | 5,727,092 A | 3/1998 | Sandford, II et al. ........ 382/251 |
| 5,461,426 A | 10/1995 | Limberg et al. | | 5,735,547 A | 4/1998 | Morelle et al. ............... 283/67 |
| 5,463,209 A | 10/1995 | Figh ............... 235/383 | | 5,740,244 A | 4/1998 | Indeck et al. ............... 713/176 |
| 5,469,222 A | 11/1995 | Sprague ............... 348/580 | | 5,742,845 A | 4/1998 | Wagner ............... 395/821 |
| 5,469,506 A | 11/1995 | Berson et al. ............... 713/186 | | 5,745,604 A | 4/1998 | Rhoads ............... 382/232 |
| 5,473,631 A | 12/1995 | Moses | | 5,751,854 A | 5/1998 | Saitoh et al. ............... 382/218 |
| 5,479,168 A | 12/1995 | Johnson et al. | | 5,761,686 A | 6/1998 | Bloomberg ............... 707/529 |
| 5,481,294 A | 1/1996 | Thomas et al. | | 5,768,426 A | 6/1998 | Rhoads ............... 382/232 |
| 5,488,664 A | 1/1996 | Shamir | | 5,778,102 A | 7/1998 | Sandford, II et al. ........ 382/251 |
| 5,493,677 A | 2/1996 | Bfalogh ............... 707/104.1 | | 5,790,693 A | 8/1998 | Graves et al. ............... 382/135 |
| 5,495,581 A | 2/1996 | Tsai ............... 707/526 | | 5,790,697 A | 8/1998 | Munro et al. ............... 382/135 |
| 5,496,071 A | 3/1996 | Walsh ............... 283/70 | | 5,804,803 A | 9/1998 | Cragun et al. ............... 235/375 |
| 5,499,294 A | 3/1996 | Friedman | | 5,809,160 A | 9/1998 | Powell et al. ............... 382/100 |
| 5,502,576 A | 3/1996 | Ramsay et al. ............. 358/444 | | 5,809,317 A | 9/1998 | Kogan et al. ............ 707/501.1 |
| 5,515,081 A | 5/1996 | Vasilik | | 5,817,205 A | 10/1998 | Kaule ............... 382/294 |
| 5,521,722 A | 5/1996 | Colvill et al. ............... 358/500 | | 5,818,441 A | 10/1998 | Throckmorton et al. .... 345/717 |
| 5,524,933 A | 6/1996 | Kunt et al. | | 5,819,289 A | 10/1998 | Sanford, II et al. ...... 707/104.1 |
| 5,530,751 A | 6/1996 | Morris | | 5,825,871 A | 10/1998 | Mark ............... 379/357.03 |
| 5,530,759 A | 6/1996 | Braudaway et al. .......... 380/54 | | 5,825,892 A | 10/1998 | Braudaway et al. ........... 380/51 |
| 5,530,852 A | 6/1996 | Meske, Jr. et al. .......... 709/206 | | 5,838,458 A | 11/1998 | Tsai ............... 358/402 |
| 5,532,920 A | 7/1996 | Hartrick et al. | | 5,841,886 A | 11/1998 | Rhoads ............... 382/115 |
| 5,537,223 A | 7/1996 | Curry | | 5,841,978 A | 11/1998 | Rhoads ............... 709/217 |
| 5,539,471 A | 7/1996 | Myhrvold et al. | | 5,848,144 A | 12/1998 | Ahrens ............... 379/219 |
| 5,539,735 A | 7/1996 | Moskowitz | | 5,848,413 A | 12/1998 | Wolff ............... 707/10 |
| 5,541,662 A | 7/1996 | Adams et al. | | 5,852,673 A | 12/1998 | Young ............... 382/164 |
| 5,544,255 A | 8/1996 | Smithies et al. | | 5,857,038 A | 1/1999 | Owada et al. ............... 382/284 |
| 5,548,646 A | 8/1996 | Aziz et al. | | 5,862,218 A | 1/1999 | Steinberg ............... 713/176 |
| 5,557,333 A | 9/1996 | Jungo et al. | | 5,862,260 A | 1/1999 | Rhoads ............... 382/231 |
| 5,559,559 A | 9/1996 | Jungo et al. | | 5,869,819 A | 2/1999 | Knowles et al. ............. 235/375 |

| | | | |
|---|---|---|---|
| 5,871,615 A | 2/1999 | Harris | 162/140 |
| 5,872,589 A | 2/1999 | Morales | 725/24 |
| 5,875,249 A | 2/1999 | Mintzer et al. | 380/54 |
| 5,893,101 A | 4/1999 | Balogh et al. | 707/100 |
| 5,898,779 A | 4/1999 | Squilla et al. | 713/176 |
| 5,900,608 A | 5/1999 | Iida | 235/381 |
| 5,902,353 A | 5/1999 | Reber et al. | 709/219 |
| 5,903,729 A | 5/1999 | Reber et al. | 709/219 |
| 5,905,248 A | 5/1999 | Russell et al. | 235/462.15 |
| 5,905,251 A | 5/1999 | Knowles | 235/472.01 |
| 5,905,810 A | 5/1999 | Jones et al. | 382/135 |
| 5,913,210 A | 6/1999 | Call | 707/4 |
| 5,915,027 A | 6/1999 | Cox et al. | 380/54 |
| 5,930,369 A * | 7/1999 | Cox et al. | 380/54 |
| 5,930,767 A | 7/1999 | Reber et al. | 705/26 |
| 5,932,863 A | 8/1999 | Rathus et al. | 235/462.15 |
| 5,933,798 A | 8/1999 | Linnartz | 702/191 |
| 5,933,829 A | 8/1999 | Durst et al. | 707/10 |
| 5,938,726 A | 8/1999 | Reber et al. | 709/217 |
| 5,938,727 A | 8/1999 | Ikeda | 709/219 |
| 5,939,695 A | 8/1999 | Nelson | 235/383 |
| 5,940,595 A | 8/1999 | Reber et al. | 709/227 |
| 5,943,422 A | 8/1999 | Van Wie et al. | 705/54 |
| 5,949,055 A | 9/1999 | Fleet et al. | 235/469 |
| 5,950,173 A | 9/1999 | Perkowski | 705/26 |
| 5,963,916 A | 10/1999 | Kaplan | 705/26 |
| 5,971,277 A | 10/1999 | Cragun et al. | 235/462.01 |
| 5,974,141 A | 10/1999 | Saito | 705/52 |
| 5,974,548 A | 10/1999 | Adams | 713/200 |
| 5,978,773 A | 11/1999 | Hudetz et al. | 705/23 |
| 5,979,757 A | 11/1999 | Tracy et al. | 235/383 |
| 5,983,218 A | 11/1999 | Syeda-Mahmoo | 707/3 |
| 5,991,426 A | 11/1999 | Cox et al. | 382/100 |
| 6,005,501 A | 12/1999 | Wolosewicz | 341/52 |
| 6,024,287 A | 2/2000 | Takai et al. | |
| 6,035,177 A | 3/2000 | Moses et al. | 725/22 |
| 6,052,486 A | 4/2000 | Knowlton et al. | 382/232 |
| 6,064,764 A | 5/2000 | Bhaskaran et al. | 382/183 |
| 6,065,119 A | 5/2000 | Sandford, II et al. | 713/200 |
| 6,104,812 A * | 8/2000 | Koltai et al. | 380/51 |
| 6,122,403 A | 9/2000 | Rhoads | 382/233 |
| 6,166,750 A | 12/2000 | Negishi | 347/131 |
| 6,188,787 B1 | 2/2001 | Ohmae et al. | |
| 6,233,684 B1 | 5/2001 | Stefik et al. | 713/176 |
| 6,240,121 B1 | 5/2001 | Senoh | 375/130 |
| 6,243,480 B1 | 6/2001 | Zhao et al. | |
| 6,246,777 B1 | 6/2001 | Agarwal et al. | 382/100 |
| 6,266,430 B1 | 7/2001 | Rhoads et al. | 382/100 |
| 6,272,634 B1 | 8/2001 | Tewfik et al. | 713/176 |
| 6,275,599 B1 | 8/2001 | Adler et al. | 382/100 |
| 6,285,775 B1 | 9/2001 | Wu et al. | 382/100 |
| 6,301,360 B1 | 10/2001 | Bocionek et al. | |
| 6,311,214 B1 | 10/2001 | Rhoads | 709/217 |
| 6,321,648 B1 | 11/2001 | Berson et al. | |
| 6,321,981 B1 | 11/2001 | Ray et al. | |
| 6,324,573 B1 | 11/2001 | Rhoads | 709/218 |
| 6,332,194 B1 | 12/2001 | Bloom et al. | 713/176 |
| 6,334,187 B1 | 12/2001 | Kadono | 713/176 |
| 6,343,204 B1 | 1/2002 | Yang | |
| 6,359,985 B1 | 3/2002 | Koch et al. | |
| 6,512,837 B1 | 1/2003 | Ahmed | 382/100 |
| 2001/0017709 A1 | 8/2001 | Murakami et al. | |
| 2001/0020270 A1 | 9/2001 | Yeung et al | |
| 2001/0024510 A1 | 9/2001 | Iwamura | |
| 2001/0026629 A1 | 10/2001 | Oki | |
| 2001/0030759 A1 | 10/2001 | Hayashi et al. | |
| 2001/0052076 A1 * | 12/2001 | Kadono | 713/176 |
| 2001/0053299 A1 | 12/2001 | Matsunoshita et al. | |
| 2002/0001095 A1 | 1/2002 | Kawakami et al. | |
| 2002/0003891 A1 | 1/2002 | Hoshino | |
| 2002/0009208 A1 | 1/2002 | Alattar et al. | 382/100 |
| 2002/0010684 A1 | 1/2002 | Moskowitz | |
| 2002/0018228 A1 | 2/2002 | Torigoe | |
| 2002/0051237 A1 | 5/2002 | Ohara | |

FOREIGN PATENT DOCUMENTS

| | | | |
|---|---|---|---|
| DE | 3806411 | | 8/1989 |
| DE | 19521969 C1 | | 2/1997 |
| EP | 366381 A2 | | 10/1989 |
| EP | 372 601 | | 6/1990 |
| EP | 411 232 | | 2/1991 |
| EP | 418 964 A1 | | 3/1991 |
| EP | 441 702 | | 8/1991 |
| EP | 493 091 | | 7/1992 |
| EP | 058 482 | | 8/1992 |
| EP | 551 016 | | 7/1993 |
| EP | 581 317 | | 2/1994 |
| EP | 605 208 | | 7/1994 |
| EP | 649 074 | | 4/1995 |
| EP | 705 025 | | 4/1996 |
| EP | 711061 | | 5/1996 |
| EP | 0789480 | | 8/1997 |
| EP | 872995 | | 10/1998 |
| EP | 642060 | | 4/1999 |
| EP | 0642060 B1 | | 4/1999 |
| EP | 1041815 | | 10/2000 |
| EP | 1077570 | | 2/2001 |
| EP | 1122939 | | 8/2001 |
| GB | 2063018 | | 5/1981 |
| GB | 2067871 | | 7/1981 |
| GB | 2196167 | | 4/1988 |
| GB | 2204984 | | 11/1988 |
| JP | 4-248771 | | 2/1992 |
| JP | 5/242217 | | 9/1993 |
| JP | 8-30759 | | 2/1996 |
| WO | WO 89/08915 | | 9/1989 |
| WO | WO 93/25038 | | 12/1993 |
| WO | WO94/27228 | | 11/1994 |
| WO | WO95/04665 | | 2/1995 |
| WO | WO95/10813 | | 4/1995 |
| WO | WO 95/10835 | | 4/1995 |
| WO | WO 95/14289 | | 5/1995 |
| WO | WO 95/20291 | | 7/1995 |
| WO | WO 96/26494 | | 8/1996 |
| WO | WO 96/27259 | | 9/1996 |
| WO | WO97/43736 | | 11/1997 |
| WO | WO98/14887 | | 4/1998 |
| WO | WO98/20642 | | 5/1998 |
| WO | WO98/24050 | | 6/1998 |
| WO | WO98/40823 | | 9/1998 |
| WO | WO98/49813 | | 11/1998 |
| WO | WO99/34277 | | 7/1999 |
| WO | WO99/36876 | 7/1999 | 382/100 |
| WO | WO00/44131 | | 7/2000 |
| WO | WO 01/08405 | | 2/2001 |
| WO | WO 01/80169 | 10/2001 | 382/100 |

OTHER PUBLICATIONS

Cox et al., "Secure Spread Spectrum Watermarking for Images, Audio, and Video," IEEE1996, pp. 243–246.

Dautzenberg, "Watermarking Images,", Department of Microelectronics and Electrical Engineering, Trinity College Dublin, 47 pages, Oct. 1994.

Dittmann, J., "Chapter 3: Telltale Watermarking," in Multiresolution Digital Watermarking: Algorithms and Implications for Multimedia Signals, Ph.D: thesis at Univ. of Toronto, 1999, pp. 23–52.

Dittmann, J. et al., "Content–based Digital Signature for Motion Pictures Authentication and Content–Fragile Watermarking," IEEE Proc. Int. Conf. on Multimedia Computing and Systems, Jun. 1999, pp. 209–213.

Kundur et al., "A Robust Digital Image Watermarking Method and Wavelet–Based Fusion," IEEE Jul. 1997, pp. 544,547.

Lamy, P. et al., "Content–Based Watermarking for Image Authentication," Proc. 3.sup.rd Int. Workshop on Information Hiding, Sep./Oct. 1999, pp. 187–198.

Lin, C.–Y. et al., "Generating Robust Digital Signature for Image/Video Authentication," Proc. Multimedia and Security Workshop at ACM Multimedia'98, Sep. 1998, pp. 49–54.

Lin, C.–Y. et al., "Issues and Solutions for Authenticating MPEG Video," Proc. SPIE vol. 3657: Security and Watermarking of Multimedia Contents, Jan. 1999, pp. 54–65.

Schneider, M., "A Robust Content Based Digital Signature for Image Authentication," iEEE Proc. Int. Conf. on Image Processing, Sep. 1996, pp. 227–230 (vol. 3).

Sharma et al., "Practical Challenges For Digital Watermarking Applications", May 3, 2001, pp. 1–10.

Szepanski, "A Signal Theoretic Method for Creating Forgery–Proof Documents for Automatic Verification," Proceedings 1979 Carnahan Conference on Crime Countermeasures, May 16, 1979, pp. 101–109.

Szepanski, "Additive Binary Data Transmission for Video Signals," Conference of the Communications Engineering Society, 1980, NTG Technical Reports, vol. 74, pp. 343–351. (German text and English translation enclosed).

Xie, L. et al., "Secure MPEG Video Communications by Watermarking," Proc. Conf. of ATIRP (Advanced Telecommunications and Information Distribution Research Project), Feb. 1999, pp. 459–462.

U.S. patent application Ser. No. 60/000,442, Hudetz, filed Jun. 20, 1995.

U.S. patent application Ser. No. 60/082,228, Rhoads, filed Apr. 16, 1998.

U.S. patent application Ser. No. 60/141,763, Davis, filed Jun. 30, 1999.

U.S. patent application Ser. No. 60/158,015, Davis et al., filed Oct. 6, 1999.

U.S. patent application Ser. No. 09/314,648, Rodriguez et al., filed May 19, 1999.

U.S. patent application Ser. No. 09/342,668, Rodriguez et al., filed Jun. 29, 1999.

U.S. patent application Ser. No. 09/342,971, Rodriguez et al., filed Jun. 29, 1999.

U.S. patent application Ser. No. 09/679,261, Davis et al., filed Oct. 4, 2000.

U.S. patent application Ser. No. 09/562,517, Davis et al., filed May 1, 2000.

U.S. patent application Ser. No. 09/547,664, Rhoads et al., filed Apr. 12, 2000.

U.S. patent application Ser. No. 09/571,442, Rhoads et al., filed May 15, 2000.

U.S. patent application Ser. No. 09/858,189, Rhoads et al., filed May 14, 2001.

U.S. patent application Ser. No. 09/631,409, Brundage et al., filed Aug. 3, 2000.

U.S. patent application Ser. No. 09/452,021, Davis et al., filed Nov. 30, 1999.

U.S. patent application Ser. No. 09/629,401, Seder et al., filed Aug. 1, 2000.

U.S. patent application Ser. No. 09/473,396, Evans et al., filed Dec. 28, 1999.

U.S. patent application Ser. No. 09/563,664, Levy et al., filed May 2, 2000.

U.S. patent application Ser. No. 09/670,115, Rhoads et al., filed Sep. 26, 2000.

Brassil et al., Electronic Marking and Indentification Techniques to Discourage Document Copying, Proceedings of INFOCOM '94 Conference on Computer, IEEE Commun. Soc Conference. Jun. 12–16, 1994, 1278–1287.

Bruckstein, A.M.; Richardson, T.J., A holographic transform domain image watermarking method, Circuits, Systems, and Signal Processing vol. 17, No. 3 p. 361–89, 1998. This paper includes an appendix containing an internal memo of Bell Labs, which according to the authors of the paper, was dated Sep. 1994.

"High Water FBI Limited Presentation Image Copyright Protection Software," FBI Ltd brochure, Jul., 1995, 17 pages.

Koch et al., "Copyright Protection for Multimedia Data," Fraunhofer Institute for Computer Graphics, Dec. 16, 1994, 15 pages.

Koch et al., "Towards Robust and Hidden Image Copyright Labeling," Proc. of 1995 IEEE Workshop on Nonlinear Signal and Image Processing, Jun. 20–22, 1995, 4 pages.

Kurak et al., "A Cautionary Note On Image Downgrading," 1992 IEEE, pp. 153–159.

Mintzer et al., "Safeguarding Digital library Contents and Users" Digital Watermarking, D–Lib Magazine, Dec. 1997: ISSN 1082–9873.

Rindfrey, "Towards an Equitable System for Access Control and Copyright Protection in Broadcast Image Service: The Equicrypt Approach," Intellectual Property Rights and New Technologies, Proc. of the Conference, R. Oldenbourg Verlag Wien Munchen 1993, 12 pages.

Schreiber et al., "A Compatible High–Definition Television System Using the Noise–Margin Method of Hiding Enhancement Information," SMPTE Journal, Dec. 1989, pp. 873–879.

SDMI Example Use Scenarios (Non–Exhaustive), Version 1.2, Jun. 16, 1999.

Szepanski, "A Signal Theoretic Method for Creating Forgery–Proof Documents for Automatic Verification," Proceedings 1979 Carnahan Conference on Crime Countermeasures, May 16, 1979, pp. 101–109.

Szepanski, "Additive Binary Data Transmission for Video Signals," Papers Presented at Conf. Of Comm. Engineering Soc. Sep. 30–Oct. 3, 1980, Technical Reports vol. 74, pp. 342–352.

Tanaka et al., "A Visual Retrieval System with Private Information for Image Database," Proceeding International Conference on DSP Applications and Technology, Oct. 1991, pp. 415–421.

Tanaka et al., "New Integrated Coding Schemes for Computer–Aided Facsimile ," Proc. IEEE Int'l Conf. on Sys: Integration, Apr. 1990, pp. 275–281.

Tirkel et al, "Electronic Water Mark," DICTA–93, Macquarie University, Sydney, Australia, Dec., 1993, pp. 666–673.

Weber et al., "Correlative Image Registration," Seminars in Nuclear Medicine, vol XXIV, No. 4, Oct., 1994, pp. 311–323.

Szepanski, "A Signal Theoretic Method for Creating Forgery–Proof Documents for Automatic Verification," Proceedings 1979 Carnahan Conference on Crime Countermeasures, May 16, 1979, pp. 101–109.

Dautzenberg, "Watermarking Images," Department of Microelectronics and Electrical Engineering, Trinity College Dublin, 47 pages, Oct. 1994.

Szepanski, "Additive Binary Data Transmission for Video Signals," Conference of the Communications Engineering Society, 1980, NTG Technical Reports, vol. 74, pp. 343–351. (German text and English translation enclosed).

U.S. patent application Ser. No. 60/071,983, Levy, filed Jan. 20, 1998.

U.S. patent application Ser. No. 09/404,291, Levy, filed Sep. 23, 1999.

U.S. patent application Ser. No. 60/114,725, Levy, filed Dec. 31, 1998.

U.S. patent application Ser, No. 09/234,780, Rhoads et al., filed Jan. 20, 1999.

U.S. patent application Ser. No. 60/116,641, Cookson, filed Jan. 21, 1999.

U.S. patent application Ser. No. 09/478,713, Cookson, filed Jan. 6, 2000.

Cookson, Chris, General Principles of Music Uses on Portable Devices, presented to SDMI, Mar. 5, 1999.

Winograd, J.M., "Audio Watermarking Architecture for Secure Digital Music Distribution," a Proposal to the SDMI Portable Devices Working Group, by Aris Technologies, Inc., Mar. 26, 1999.

Mintzer et al., "Safeguarding Digital Library Contents and Users: Digital Watermarking," D–Lib Magazine, Dec. 1997, 12 pages.

U.S. patent application Ser. No. 09/765,102, Shaw, filed Jan. 17, 2001.

U.S. patent application Ser. No. 09/761,349, Rhoads, filed Jan. 16, 2001.

U.S. patent application Ser. No. 09/761,280, Rhoads, filed Jan. 16, 2001.

U.S. patent application Ser. No. 09/645,779, Tian et al., filed Aug. 24, 2000.

U.S. patent application Ser. No. 09/689,226, Brunk, filed Oct. 11, 2000.

U.S. patent application Ser. No. 09/689,250, Ahmed, filed Oct. 11, 2000.

U.S. patent application Ser. No. 09/689,293, Tian et al., filed Oct. 11, 2000.

U.S. patent application Ser. No. 09/625,577, Carr et al., filed Jul. 25, 2000.

U.S. patent application Ser. No. 09/574,726, Rhoads et al., filed May 18, 2000.

U.S. patent application Ser. No. 09/562,524, Carr et al., filed May 1, 2000.

U.S. patent application Ser. No. 09/498,223, Rhoads et al., filed Feb. 3, 2000.

U.S. patent application Ser. No. 09/465,418, Rhoads et al., filed Dec. 16, 1999.

U.S. patent application Ser. No. 09/431,990, Rhoads, filed Nov. 3, 1999.

U.S. patent application Ser. No. 09/428,359, Davis et al., filed Oct. 28, 2000.

U.S. patent application Ser. No. 09/342,972, Rhoads, filed Jun. 29, 1999.

U.S. patent application Ser. No. 09/293,602, Rhoads, filed Apr. 15, 1999.

U.S. patent application Ser. No. 09/293,601, Rhoads, filed Apr. 15, 1999.

U.S. patent application Ser. No. 09/287,940, Rhoads, filed Apr. 7, 1999.

U.S. patent application Ser. No. 09/185,380, Davis et al., filed Nov. 3, 1998.

U.S. patent application Ser. No. 09/074,034, Rhoads, filed May 6, 1998.

U.S. patent application Ser. No. 09/127,502, Rhoads, filed Jul. 31, 1998.

U.S. patent application Ser. No. 60/082,228, Rhoads, filed Apr. 16, 1998.

U.S. patent application Ser. No. 09/198,138, Alattar, filed Apr. 17, 2000.

*Audio Watermarking Architectures for Secure Digital Music Distribution, A Proposal to the SDMI Portable Devices Working Group* by ARIS Technologies, Inc, Mar. 26, 1999, pp. 1–11.

*Audio Watermarking Architectures for Persistent Protection, Presentation to SDMI PDWG*, Mar. 29, 1999, J. Winograd, Aris Technologies, pp 1–16.

*Audio Watermarking System to Screen Digital Audio Content for LCM Acceptance, A Proposal Submitted in Response to PDWG99050504–Transition CfP* by ARIS Technologies, Inc., May 23, 1999, Document Version 1.0, 15 pages.

Boland et al., "Watermarking Digital Images for Copyright Protection", *Fifth Int'l Conference on Image Processing and it's Application*, Jul. 1995, pp. 326–330.

Levy, "AIPL's l Proposal for SDMI: An Underlying Security System" (slide presentation), Mar. 29, 1999, 23 slides.

*Microsoft Response to CfP for Technology Solutions to Screen Digital Audio Content for LCM Acceptance*, SDMI, PDWG Tokyo, May 23, 1999, 9 pages.

*Response to CfP for Technology Solutions to Screen Digital Audio Content for LCM Acceptance*, NTT Waveless Radio Consotium, May 23, 1999, 9 pages.

Sandford II et al., "The Data Embedding Method", *Proceedings of the SPIE* Vol: 2615, pp. 226–259, 1996.

Thomas, Keith, *Screening Technology for Content from Compact Discs*, May 24, 1999, 11 pages.

Tirkel et al., "Electronic Water Mark," *Dicta–93*, Marquarie University, Sydney, Australia, Dec., 1993, pp. 666–672.

Vidal et al., "Non–Noticeable Information Embedding in Color Images: Marking and Detection", *IEEE* 1999, pp. 293–297.

Wolfgang et al., "A Watermark for Digital Images," *Computer Vision and Image Processing Laboratory, Purdue University*, Sep. 1996, pp. 219–222.

"Access Control and COpyright Protection for Images, WorkPackage 8: Watermarking," Jun. 30, 1995, 46 pages "Access Control and COpyright Protection for Images, WorkPackage 3: Evaluation of Existing Systems," Apr. 19, 1995, 68 pages.

"Access Control and COpyright Protection for Images, WorkPackage 1: Access Control and Copyright Protection for Images Need Evaluation," Jun., 1995, 21 pages.

"Access Control and COpyright Protection for Images, Conditional Access and Copyright Protection Based on the Use of Trusted Third Parties," 1995, 43 pages.

Arachelian, "White Noise Storm," Apr. 11, 1994, Internet reference, 13 pages.

Arazi, et al., "Intuition, Perception, and Secure Communication," IEEE Transactionson Systems, Man, and Cybernetics, vol. 19, No. 5, Sep./Oct. 1989, pp. 1016–1020.

Arthur, "Digital Fingerprints Protect Artwork," New Scientist, Nov. 12, 1994, p. 24.

Aura, "Invisible Communication," Helskinki University of Technology, Digital Systems Laboratory, Nov. 5, 1995, 13 pages.

Bender et al., "Techniques for Data Hiding," Draft Preprint, Private Correspondence, dated Oct. 30, 1995.

Bender et al., "Techniques for Data Hiding," Massachussetts Institute of Technology, Media Laboratory, Jan. 1995, 10 pages.

Boneh, "Collusion–Secure Fingerprinting for Digital Data," Department of Computer Science, Princeton University, 1995, 31 pages.

Boney et al., "Digital Watermarks for Audio Signals," Proceedings of Multimedia '96, 1996 IEEE, pp. 473–480.

Boucqueau et al., Equitable Conditional Access and Copyright Protection for Image Based on Trusted Third Parties, Teleservices & Multimedia Communications, 2nd Int. Cost 237 Workshop, Second International Cost 237 Workshop, Nov., 1995; published 1996, pp. 229–243.

Brassil et al., "Hiding Information in Document Images," Nov., 1995, 7 pages.

Brown, "S–Tools for Windows, Version 1.00, .COPYRGT. 1994 Andy Brown, What is Steganography," Internet reference, Mar. 6, 1994, 6 pages.

Bruyndonckx et al., Neural Network Post–Processing of Coded Images Using Perceptual Masking, 1994, 3 pages.

Bruyndonckx et al., "Spatial Method for Copyright Labeling of Digital Images," 1994, 6 pages.

Burgett et al., "A Novel Method for Copyright Labeling Digitized Image Data," requested by e–mail from author (unavailable/password protected on IGD WWW site); received Sep. 18, 1995, 12 pages.

Caronni, "Assuring Ownership Rights for Digital Images," Published in the Proceedings of Reliable IT Systems, VIS '95, HH. Bruggemann and W. Gerhardt–Hackl (Ed.), Vieweg Publishing Company, Germany, 1995, Jun. 14, 1994, 10 pages.

Caruso, "Digital Commerce, 2 plans for watermarks, which can bind proof of authorship to electronic works." New York Times, Aug. 7, 1995, one page.

Castro et al., "Registration of Translated and Rotated Images Using Finite Fourier Transforms," IEEE Transactions on Pattern Analysis and Machine Intelligence, vol. PAMI–9, No. 5, Sep. 1987, pp. 700–703.

Choudhury, et al., "Copyright Protection for Electronic Publishing over Computer Networks," IEEE Network Magazine, Jun. 1994, 18 pages.

Clarke, "Invisible Code Tags Electronic Images," Electronic Engineering Times, Jun. 12, 1995, n. 852, p. 42.

"Copyright Protection for Digital Images, Digital Fingerprinting from FBI," Highwater FBI brochure, 1995, 4 pages.

"The Copyright Can of Worms Opened Up By The New Electronic Media," Computergram Internations, pCGN07170006, Jul. 17, 1995 and "The Copyright Can of Worms Opened Up By the New Electronic Media—2," Computergram Internations, pCGN07210008, Jul. 21, 1995, 3 pages total.

Cox et al., "Secure Spread Spectrum Watermarking for Multimedia," NEC Research Institute Technical Report, Dec. 5, 1995, 33 pages.

Cox et al., "A Secure, Imperceptable Yet Perceptually Salient, Spread Spectrum Watermark for Multimedia," IEEE, Southcon/96, Conference Record, pp. 192–197, 1996.

"Cyphertech Systems: Introduces Digital Encoding Device to Prevent TV Piracy," Hollywood Reporter, Oct. 20, 1993, p. 23.

Delaigle et al., "Digital Watermarking," Proc. SPIE—Int. Soc. Opt. Eng., vol. 2659, pp. 99–110, 1996.

Delaigle et al., "A Psychovisual Approach for Digital Picture Watermarking," 1995, 20 pages.

DICE Digital Watermark System, Q&A, Dec., 1995, 12 pages.

Digimarc presentation at RSA Conference, approximately Jan. 17, 1996, 4 pages.

Fimmerstad, "The Virtual Art Museum," Ericsson Connexion, Dec., 1995, pp. 29–31.

Fitzgerald, "Invisible Digital Copyright ID," Editor & Publisher, Jun. 25, 1994, p. 62.

"Foiling Card Forgers With Magnetic 'Noise'," Wall Street Journal, Feb. 8, 1994.

Frequently Asked Qustions About Digimarc Signature Technology, Aug. 1, 1995, http://www.digimarc.com, 9 pages.

Friedman, "The Trustworthy Digital Camera: Restoring Credibility to the Photographic Image," IEEE Transactions on Consumer Electronics, vol. 39, No. 4, Nov., 1993, pp. 905–910.

Gabor, et al., "Theory of Communication," J. Inst. Elect. Eng. 93, 1946, pp. 429–441.

Hartung et al., Digital Watermarking of Raw and Compressed Video, Proc. SPIE 2952, Digital Compression Technologies and Systems for Video Communications, Oct., 1996, pp 205–213.

Hect, "Embedded Data Glyph Technology for Hardcopy Digital Documents," SPIE vol. 2171, Feb. 1994, pp. 341–352.

"Holographic signatures for digital images," The Seybold Report on Desktop Publishing, Aug. 1995, one page.

Humphrey, "Stamping Out Crime," Hollywood Reporter, Jan. 26, 1994, p. S48.

Jain, "Image Coding Via a Nearest Neighbors Image Model," IEEE Transactions on Communications, vol. COM–23, No. 3, Mar. 1975, pp. 318–331.

Johhnson, "Steganography," Dec. 10, 1995, 32 pages.

JPEG Group's JPEG Software (release 4), ftp.csua.berekeley.edu/pub/cypherpunks/applications/jsteg/jpeg.Announcement.gz.

Kassam, Signal Detection in Non–Gaussian Noise, Dowden & Culver, 1988, pp. 1–96.

Koch et al., "Digital Copyright Labeling Providing Evidence of Misuse and Tracking Unauthorized Distribution of Copyrighted Materials," Oasis Magazine, Dec. 1995, 3 pages.

Luc, "Analysis of Spread Spectrum System Parameters for Design of Hidden Transmission," Radioengineering, vol. 4, No. 2, Jun. 1995, pp. 26–29.

Machado, "Announcing Stego 1.0a2, The First Steganography Tool for the Macintosh," Internet reference, Nov. 28, 1993, 3 pages.

Macq, "Cryptology for Digital TV Broadcasting," Proceedings of the IEEE, vol. 83, No. 6, Jun. 1995, pp. 944–957.

Matthews, "When Seeing is Not Believing," New Scientist, Oct. 16, 1993, pp. 13–15.

Matsui et al., "Video–Steganography: How to Secretly Embed a Signature in a Picture," IMA Intellectual Property Project Proceedings, Jan. 1994, vol. 1, Issue 1, pp. 187–205.

Mintzer et al., "Toward on–line, Worldwide Access to Vatican Library Materials," IBM J. Res. Develop. vol. 40 No. 2, Mar., 1996, pp. 139–162.

Moller, et al., "Rechnergestutzte Steganographie: Wie sie Funktioniert und warum folglich jede Reglementierung von Verschlusselung unsinnig ist," DuD, Datenschutz und Datensicherung, Jun. 18, 1994 318–326.

"NAB—Cyphertech Starts Anti–Piracy Broadcast Tests," Newsbytes, NEW03230023, Mar. 23, 1994.

Nakamura et al., "A Unified Coding Method of Image and Text Data Using Discrete Orthogonal Transform," Systems and Computers in Japan, vol. 21, No. 3, 1990, pp. 87–92.

Nakamura et al., "A Unified Coding Method of Dithered Image and Text Data Using Micropatterns," Electronics and Communications in Japan, Part 1, vol. 72, No. 4, 1989, pp. 50–56.

New Product Information, "FBI at AppleExpo" (Olympia, London), Nov., 1995, 2 pages.

Ohnishi et al., Embedding a Seal into a Picture Under Orthogonal Wavelet Transform, Proceedings of Multimedia '96, 1996, IEEE, pp. 514–421.

ORuanaidh et al, "Watermarking Digital Images for Copyright Protection," http://www.kalman.mee.tcd.ie/people/jjr/eva.sub.—pap.html, Feb. 2, 1996, 8 pages. (Also published Aug., 1996, IEE Proceedings–Vision, Image and Signal Processing, vol. 143, No. 4, pp. 250–256.).

Pennebaker et al., JPEG Still Image Data Compression Standard, Chapter 3, "Aspects of the Human Visual System," pp. 23–27, 1993, Van Nostrand Reinhard, New York.

Pickholtz et al., "Theory of Spread–Spectrum Communications—A Tutorial," Transactions on Communications, vol. COM–30, No. 5, May, 1982, pp. 855–884.

Pitas et al., "Applying Signatures on Digital Images," IEEE Workshop on Nonlinear Image and Signal Processing, Neos Marmaras, Greece, pp. 460–463, Jun., 1995.

Port, "Halting Highway Robbery on the Internet," Business Week, Oct. 17, 1994, p. 212.

Roberts, "Picture Coding Using Pseudorandom Noise," IRE Trans. on Information Theory, vol. 8, No. 2, Feb., 1962, pp. 145–154.

Sapwater et al., "Electronic Copyright Protection," Photo>Electronic Imaging, vol. 37, No. 6, 1994, pp. 16–21.

Schneier, "Digital Signatures, Cryptographic Algorithms Can Create Nonforgeable Signatures for Electronic Documents, Making Them Valid Legal Instruments" BYTE, Nov. 1993, pp. 309–312.

shaggy@phantom.com, "Hide and Seek v. 4.0," Internet reference, Apr. 10, 1994, 3 pages.

Short, "Steps Toward Unmasking Secure Communications," International Journal of Bifurcation and Chaos, vol. 4, No. 4, 1994, pp. 959–977.

Simmons, "Subliminal Channels; Past and Present," ETT, vol. 5, No. 4, Jul.–Aug. 1994, pp. 45–59.

Sheng et al., "Experiments on Pattern Recognition Using Invariant Fourier–Mellin Descriptors," Journal of Optical Society of America, vol. 3, No. 6, Jun., 1986, pp. 771–776.

Sklar, "A Structured Overview of Digital Communications—a Tutorial Review—Part I," IEEE Communications Magazine, Aug., 1983, pp. 1–17.

Sklar, "A Structured Overview of Digital Communications—a Tutorial Review—Part II," IEEE Communications Magazine, Oct., 1983, pp. 6–21.

"Steganography," Intellectual Property and the National Information Infrastructure The Report of the Working Group on Intellectual Property Rights, Sep. 1995, pp. 212–213.

Tanaka et al., "Embedding Secret Information Into a Dithered Multi–Level Image," Proc. IEEE Military Comm. Conf., Sep. 1990, pp. 216–220.

Tanaka, "Embedding the Attribute Information Into a Dithered Image," Systems and Computers in Japan, vol. 21, No. 7, 1990, pp. 43–50.

Tirkel et al., "A Two–Dimensional Digital Watermark," 1995, 6 pages.

Toga et al., "Registration Revisited,", Journal of Neuroscience Methods, 48 (1993), pp. 1–13.

van Schyndel et al., "Towards a Robust Digital Watermark," ACCV '95, vol. 2, Dec., 1995, pp. 504–508.

Wagner, "Fingerprinting," 1983 IEEE, pp. 18–22.

Walton, "Image Authentication for a Slippery New Age," Dr. Dobb's Journal, Apr. 1995, pp. 18–26, 82–87.

"Watermarking & Digital Signature: Protect Your Work!" Published on Internet 1996, http://Itswww.epfl.ch/.about.jordan/watermarking/html.

Wise, "The History of Copyright, Photographers' Rights Span Three Centuries," Photo>Electronic Imaging, vol. 37, No. 6, 1994.

van Schyndel et al., "A Digital Watermark," IEEE International Conference on Image Processing, Nov. 13–16, 1994. pp. 86–90.

Zhao et al., "Embedding Robust Labels Into Images for Copyright Protection," Proc. of the International Congress on Intellectual Property Rights for Specialized Information, Knowledge and New Technologies (Vienna, Austria) Aug. 21–25, 1995, 10 pages.

Bender, "Applications for Data Hiding," IBM Systems Journal, vol. 39, No. 3–4, pp. 547–568, 2000.

Gruhl et al., "Information Hiding to Foil the Casual Counterfeiter," Proc. 2d Information Hiding Workshop, LNCS, vol. 1525, pp. 1–15 (Apr. 15, 1998).

* cited by examiner

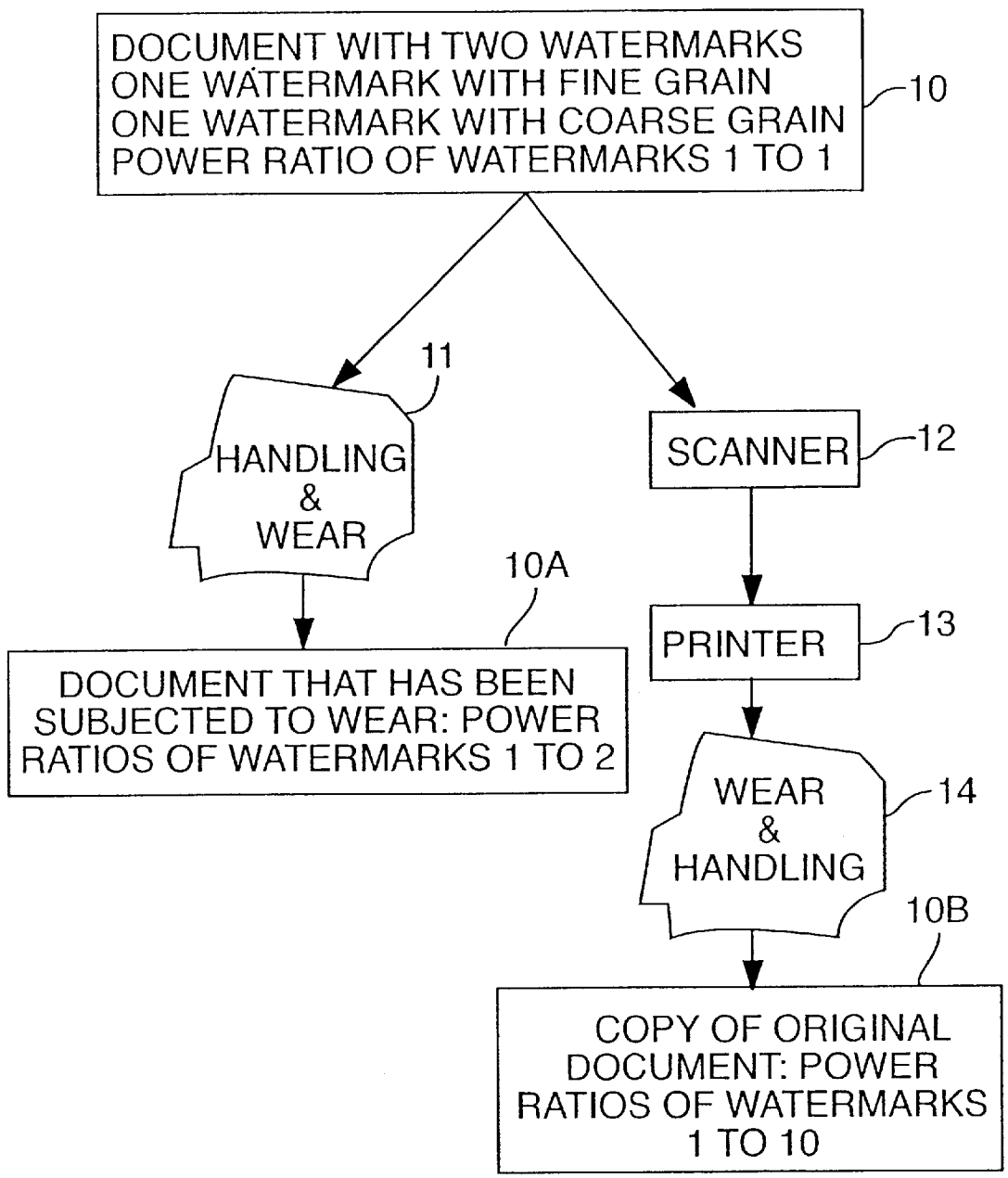

FIG. 3A  GEOMETRICALLY LINEAR ASSIGNMENT
OF PIXELS TO EACH BIT
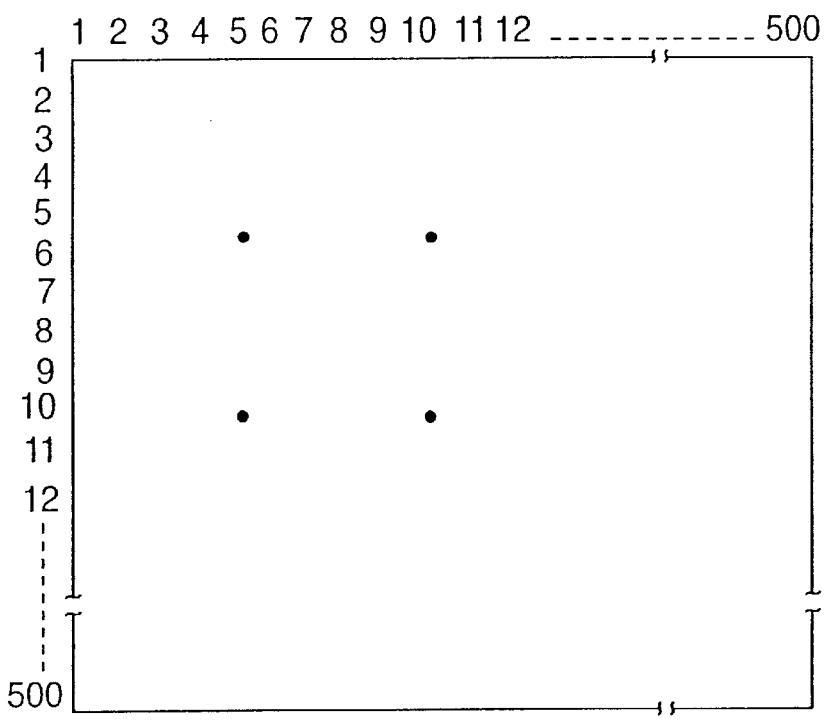
FIG. 3B  GEOMETRICALLY RANDOM ASSIGNMENT
OF PIXELS TO EACH BIT
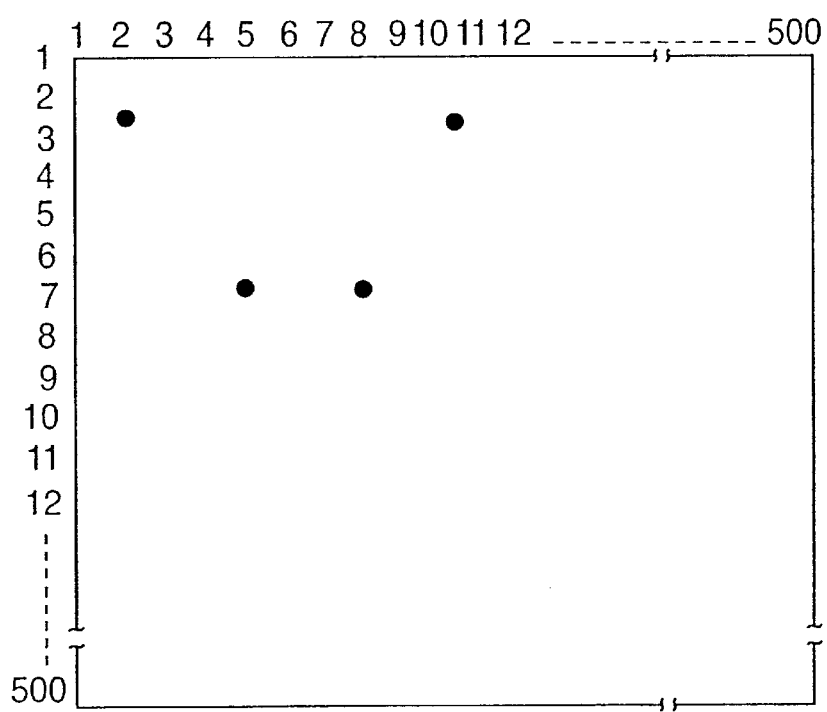

METHODS AND SYSTEMS USING MULTIPLE WATERMARKS

RELATED APPLICATIONS

The present application is a division of application Ser. No. 09/433,104, filed Nov. 3, 1999, which is a continuation in part of co-pending application Ser. No. 09/234,780, filed Jan. 20, 1999 now abandoned, which is a continuation in part of application Ser. No 60/071,983 filed Jan. 20, 1998.

FIELD OF THE INVENTION

The present invention relates to steganography, and more particularly relates to the use of multiple watermarks to determine the authenticity or history of a particular document or electronic object (e.g., image, motion picture, audio track).

BACKGROUND OF THE INVENTION

Steganographic and digital watermarking technologies are well known. For example see U.S. Pat. No. 5,636,292 and the extensive references cited therein. Also see co-pending patent applications Ser. No. 08/327,426 which was filed Oct. 21, 1994 and co-pending application Ser. No. 08/436,134 which was filed May 8, 1995.

The technology for inserting digital watermarks in images and the technology for reading or detecting digital watermarks in images is well developed, well known and described in detail in public literature. Furthermore, there are commercially available products which include programs or mechanisms for inserting digital watermarks into images. For example the commercially available and widely used products "Adobe Photoshop" which is marketed by Adobe Corporation of San Jose Calif. and "Corel Draw" program which is marked by Corel Corporation of Ontario Canada, include a facility for inserting digital watermarks into images.

The technology for making high quality copies of documents is widely available. The technical quality of scanners and color printers has been increasing rapidly. Today for a relatively low cost one can purchase a high quality scanner and a high quality color printer. Thus, it is becoming increasingly easy to duplicate documents. The ability to create high quality copies has created a need for technology which can differentiate between original documents and copies of the original.

It is known that watermarks can be used to help differentiate genuine documents from copies. However, the prior art techniques for using digital watermarks to differentiate genuine documents from copies have serious limitations. The present invention is directed to an improved technique for using steganography and digital watermark technology to facilitate differentiating original documents from copies of the original.

The present invention can also be used for various other purposes such as to embed multiple types of information in a single document or to provide watermarks that enable documents to perform special functions.

SUMMARY OF THE INVENTION

With the present invention multiple digital watermarks, each of which has a different character, are embedded in a document. The characters of the two watermarks are chosen so that the watermarks will be affected in different manners by what may subsequently happen to the document.

The detection process or mechanism reads the two digital watermarks and compares their characteristics. While wear and handling may change the characteristics of the individual watermarks, the relationship between the characteristic of the two watermarks will never-the-less give an indication as to whether a document is an original or a copy of an original.

For example according to the present invention two digital watermarks in a document may have different energy levels. The absolute energy level of a digital watermark in an original image may be decreased if a document is subject to wear. Likewise the energy level of the digital watermark in an image may be decreased if an image is scanned and reprinted on a color printer. However, the relationship between the energy level of the two digital watermarks will be different in an image that has been subject to wear and in a reproduced image. Likewise if two digital watermarks are introduced into an image where the bit pattern used to construct the digital watermarks have different patterns, the ratio between the signal to noise ratio of the watermarks will be different in an original subject to wear and in a copy generated by scanning the original and printing the scanned image. Other characteristics of multiple digital watermarks can also be used to differentiate original documents from copies.

In other embodiments, a watermark-independent assessment of wear can be performed, and the results used to aid in differentiating original documents from copies.

BRIEF DESCRIPTION OF THE FIGURES

FIG. 1 shows the paths that a document and a copy may follow.

FIG. 3A and 3B show a geometrically linear and a geometrically random assignment of pixels to a bit in a digital watermark.

DETAILED DESCRIPTION

Figure 2A:
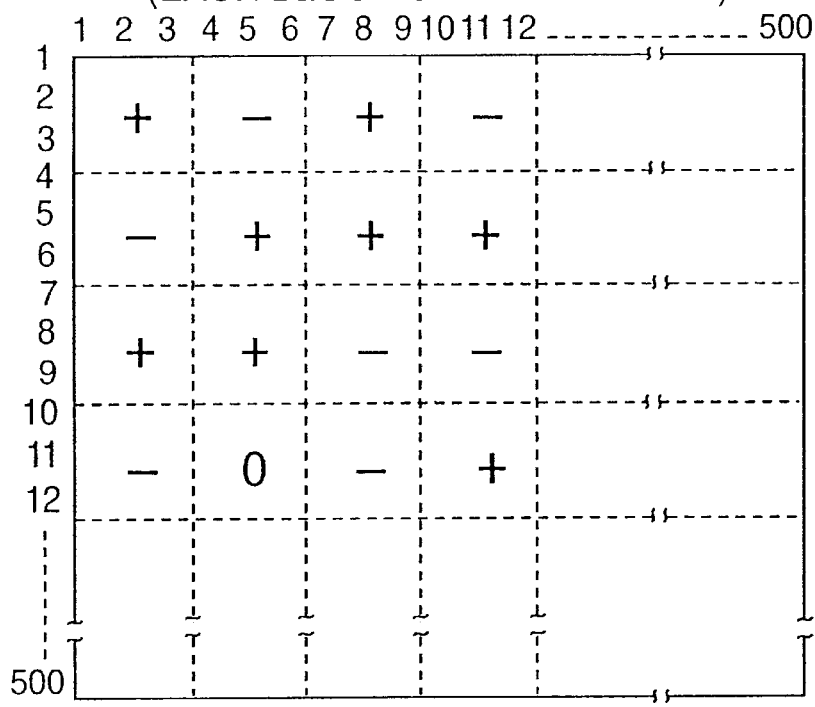
FIGS. 2A and 2B show a fine grain and a course grain watermark.

The problem of differentiating an original document from a copy is made more difficult in situations where the original document is subject to being handled, worn, folded and otherwise damaged. Many original documents such as identification documents and currency are extensively handled. The wear to which such documents is subjected reduces the quality of images on the document and therefore reduces the quality of any information embedded in the document using conventional steganographic techniques.

With the present invention, a number of different watermarks are embedded in a document. Each of the watermarks embedded in the document has a different character. All watermarks are somewhat affected when a document is subjected to wear, and all watermarks are somewhat affected when a document is duplicated by being scanned and reprinted. However, the magnitude of the effect caused by being scanned and reprinted on watermarks with certain characteristics is much greater than the effect on watermarks with different characteristics. Likewise, wear and handling of a document affects watermarks with certain characteristics much more than it affects watermarks with different characteristics.

Thus, if multiple watermarks with different characteristics are inserted into a document, it is possible to differentiate a copy from an original document that has been subjected to wear by examining the ratios of characteristics of the watermarks in the image being examined.

In order to print a document on a color printer, the document is put through a transformation from a color space such as the RGB color space to a different color space such as the CMYK (cyan, magenta, yellow, black) color space. Such transformations are well known. For example see chapter 3 entitled "Color Spaces" in a book entitled "Video Demystified, A handbook for the Digital Engineer," Second Edition, by Keith Jack, published by Harris Semiconductor/ Hightext Publications of San Diego, Calif., and "The Color PC" by Marc Miller and published by the Hayden Press.

When an image is transformed from one color space to another color space, noise is introduced into the image. Among the reasons for this is the fact that each color space has its own distinctive gamut (or range) of colors. Where the gamut of two color spaces overlap, the conversion from one color space to another color space can in theory be precise. However, there will be some areas that are in the gamut of one color space but not in the gamut of another color space. Such situations definitely introduce noise into the conversion process. Even in areas that are in the gamut of two color spaces, conversion from one color space to another color space introduces noise because of such things as round off errors. The present invention takes advantage of the fact that if an original is copied and then a copy is printed, the image on the printed copy will have gone through several conversions to which the original will not have been subjected. For example, the conversions to which a copy may be subjected are:

1) a document to RGB conversion (i.e. scanning the document into the computer),
2) a RGB to CMYK conversion,
3) a CMYK to copy conversion (i.e. printing the document).

Any characteristics of the two digital watermarks that will be affected differently by the additional conversion process to which copies are subjected can be used to differentiate copies from an original. Since the two watermarks with different characteristics are affected in a different manner by the additional conversion step, a comparison of the characteristics of the two watermarks in a document being examined will indicate if the document is an original (which has not gone through the additional conversions) or a copy which has gone through the additional conversions. While the characteristics of each watermark will have been changed by wear and by the copying process, the comparison between the characteristics of the two watermarks will still be able to differential a copy from an original.

Four embodiments of the invention are described below. Each of the embodiments utilizes two watermarks in a document. The differences between the two watermarks in the document are as follows:
In the first embodiment:
 First watermark: Has fine grain
 Second watermark: Has a course grain
In the second embodiment:
 First watermark: Has geometrically linear assignment of pixels
 Second watermark: Has geometrically random assignment of pixels.
In the third embodiment:
 First watermark: Has low power
 Second watermark: Has higher power
In the fourth embodiment:
 First watermark: uses standard RGB to HSI and HSI to RGB transformations
 Second watermark is biased before being transformed from HSI to RGB.

FIG. 1 shows the steps to which documents and copies are typically subjected. In the normal course, a document 10 may be subjected to handling and wear 11 resulting in a worn document 10A. Document 10 may also be scanned as illustrated by box 12. The scanning produces a digital image that can be printed, as illustrated by box 13. The printed image may be subjected to handling and wear 14 resulting in a copy 10B. It is noted that the document 10 may also be subject to handling and wear prior to the scanning operation 12. The task to which this invention is directed is the task of differentiating the worn document 10A from the copy 10B.

Figure 2B:
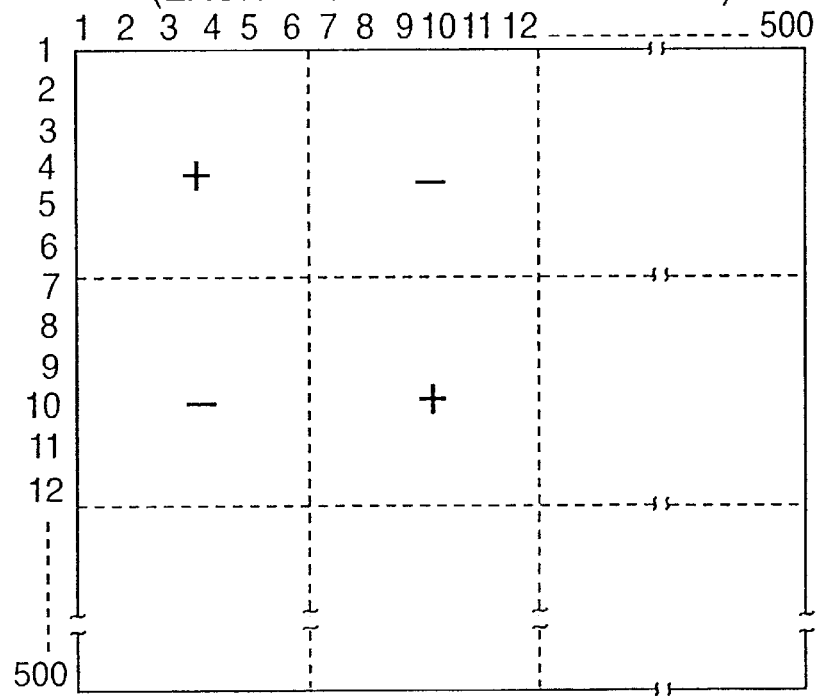

The document 10 includes an image (not explicitly shown) that has two digital watermarks inserted therein. In the first embodiment of the invention, the first watermark has a fine grain and the second watermark has a course grain. The grain of the two watermarks is illustrated in FIG. 2. FIG. 2A shows the grain of the first watermark and FIG. 2B shows the grain of the second watermark. The first watermark uses blocks of 9 pixels (a 3 by 3 block). Each of the pixels in each 9 pixel block has its gray value changed by the same amount. For example FIG. 2A shows that the first 9 pixel block has its gray value increase and the second 9 pixel block has its gray value decreased. The amount of increase and the selection of blocks that is increased and decreased is conventional.

As shown in FIG. 2B, the grain of the second watermark is in blocks that are 6 pixels by 6 pixels or 36 pixels. All of the pixels in each 36 pixel block are changed by the same amount.

In the original document 10, the two watermarks have power ratios of 1 to 1. After wear and handling, the power of the first watermark will be degraded somewhat more than the power of the second watermark. For example, as illustrated in FIG. 1, after document 10 is subjected to handling and wear, a detector which reads the watermarks might find that the power ratio of the water marks is 1 to 2.

If the document 10 is scanned and the resulting digital image is printed to make a copy of the document 10, the ratio of the power of the watermarks will be affected much more than the effect of handling and wear. For example as illustrated in FIG. 1, the power ratio of the watermarks may be 1 to 10, thereby allowing one to differentiate the worn original document 10A from the copy 10B.

It is noted that the mechanism for inserting watermarks into an image is well known, as is the technique for reading a watermark and using correlation techniques to determine the signal to noise ratio (i.e. the power) of a watermark.

FIGS. 3A and 3B show an alternative technique for implementing the present invention. In the second embodiment of the invention, the two watermarks inserted into the image on a document have different patterns of assigning pixels to the bits of the payload represented by the watermark. The first watermark utilizes a geometrically linear assignment of pixels to each bit. For example FIG. 3A shows an image that has 500 by 500 pixels. Considering a watermark payload with 50 bits, each bit of the watermark would have 5000 pixels assigned to represent that bit. A linear assignment could have each fifth bit in each row (100 bits per row) and each fifth row (50 rows) assigned to each bit of the watermark. Thus 5000 pixels would be assigned to each bit in a very orderly or linear manner.

In the second watermark the pixels would be assigned to each bit in a random manner as shown in FIG. 3B. Each bit in the watermark would still have 5000 assigned bits; however, the pixels would be a random location over the image. Naturally it should be understood that FIG. 3A and 3B illustrate how pixels are assigned to one bit of the watermark. The other bits of the watermarks would have pixels assigned in a similar manner.

Similar to the first embodiment of the invention, the watermark with a linear assignment of pixels and the watermark with a random assignment of pixels would be affected differently by handling and wear on the original document than they would be by being scanned and reprinted.

The third embodiment of the invention described herein utilizes watermarks that have different power levels. Handling and wear as contrasted to scanning and printing would affect a watermark with a low power level differently than a watermark with a high power level. Watermarks with different power levels can be inserted into a document in order to practice the present invention utilizing commercially available programs such as Adobe Photoshop or Corel Draw. In the Adobe Photoshop and Corel Draw programs, the power or intensity of the watermark can be adjusted by setting a simple control setting in the program.

Figure 4:
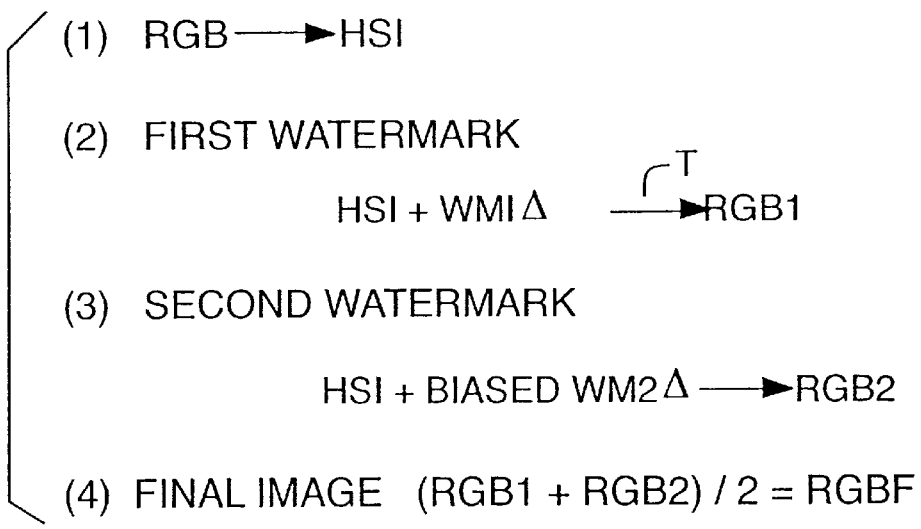
FIG. 4 illustrates a fourth embodiment of the invention.

The fourth embodiment of the invention introduces different characteristics into two watermarks by modifications made to one of the watermarks during the initial step during which the watermarks are introduced into an image. The operation of the fourth embodiment can be explained as shown in FIG. 4. First as illustrated by equation 1 there is a conversion from RGB to HSI as is conventional. This is illustrated by equation 1. As illustrated by equation 2, the first watermark is inserted into the image in a conventional manner by modifying the I value in the HSI representation of the image using the first watermark values (designated as WM1 Δ). A first RGB value designated RGB(1) is then calculated using a conventional transformation designated T. As indicated by equation 3, the second watermark WM2 is then biased toward a particular color and the biased watermark is then combined with the HSI values and transformed to a second set of RGB values designated RGB(2). Finally as indicated by equation 4, the values RGB(1) and RGB(2) are combined to form the watermarked image designated RGB(F).

The transform used to go from RGB to HSI color space (indicated in equation 1 in FIG. 4) can be anyone of a variety of known other techniques. For example, the RGB to HSI conversion can be one of the techniques explained in the above referenced text book such as the following: (which assumes that RGB and Intensity have a value range of 0 to 1 and that Red equals 0°):
First calculate:
  M=max (R,G,B)
  m=min (R,G,B)
  r=(M−R)/(M−m)
  g=(M−G)/M−n)
  b=(M−B)/(M−m)
Then calculate I, S, and H as follows:
  a) I=(M+M)/2
  b) if M=m then S=0 and H=180 if I<or =0.5 then S=(M−m)/(M+m) if I>0.5 then S=(M−m)/(2−M−m)
  c) if R=M then H=60 (b−g) if G=M then H=60 (2+r−b) if B=M then H=60(4+g−r) if H>or =360 then H=H−360 if H<0 then H=H+360

The first watermark in inserted into the RGB values in a conventional manner by modifying the I value of appropriate pixels so as to combine the watermark Δ values with HSI values. This is indicated by equation 2 in FIG. 4. Next as indicated by equation 3 in FIG. 4, the HSI values are converted to RGB values using a transform "T". The transform "T" can be conventional and it can for example be done as follows:
First calculate:
  if I<or =0.5 then M=I (I+S)
  if I>0.5 then M=I+S−IS
  m=21−M
  if S=0 then R=G=B=I and H=180°
Then calculate R, G and B as follows:
  a) if H<60 then R=M if H<120 then R=m+((M−m)/((120−H)/60)) if H<240 then R=m if H<300 then R=m+((M−m)/((H−240/60)) otherwise R=M
  b) if H<60 then G=m+((M−m)/(H/60)) if H<180 then G=M if H<240 then G=m+((M−m)/((240 −H_/60)) otherwise G=m
  c) if H<120 then B=m if H<180 then B=m+((M−m)/((H−120/60)) if H<300 then B=M otherwise B=m+((M−m)/((360−H)/60))

Next the values which represent a second watermark are used to calculate a second set of RGB values designated RGB2. In order to calculate RGB2, the values of H and S are modified so that they are slightly biased toward a particular color designated H1 and S1 New values for H and S are calculated as follows: (Note, H1 must be between 0 and 360, S1 must be non-negative and can be between 0 and 1 and X is a value between 0 and 1)
Calculate new values for H and S as follows:
  If H>H1 then H=H−(H−H1)x else H=H+(H1−H)x
  If S>S1 then S=S−(S−S1)x else S=S+(S1−S)x
Next add the second watermark to the values of HSI and transform these values to the RGB color space as indicated by equation 3 The transformation from HSI color space to RGB color space is done as previously indicated.

Finally as indicated by equation 4 in FIG. 4, the final RGB value (designated RGBF) is calculated by combining the values of RGB1 and RGB2. This combination can be done in a variety of known ways.

It is noted that in the above example the difference between the transformation used for the first and the second watermarks involves biasing the values of H and S. Alternatively a wide variety of different changes could also be made. The key to this fourth embodiment of the invention is that in effect a different transformation is used for the first and the second watermarks.

In more sophisticated embodiments, the wear of the document can be independently assessed and used to aid in distinguishing an original from a copy.

Figure 5A:
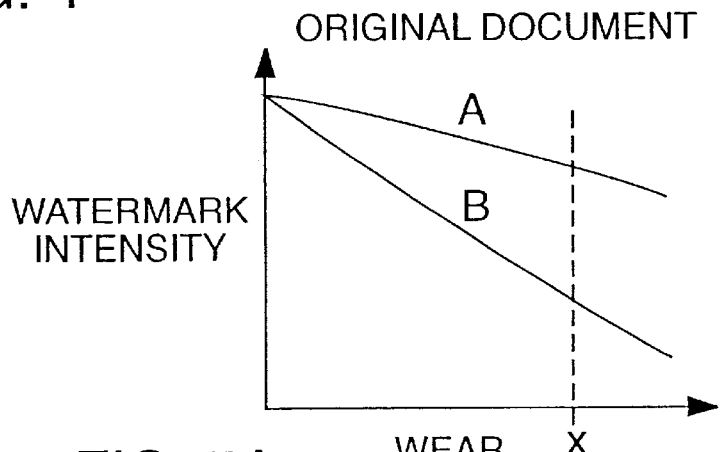
FIGS. 5A and 5B illustrate watermark strength v. wear charts.
Figure 5B:
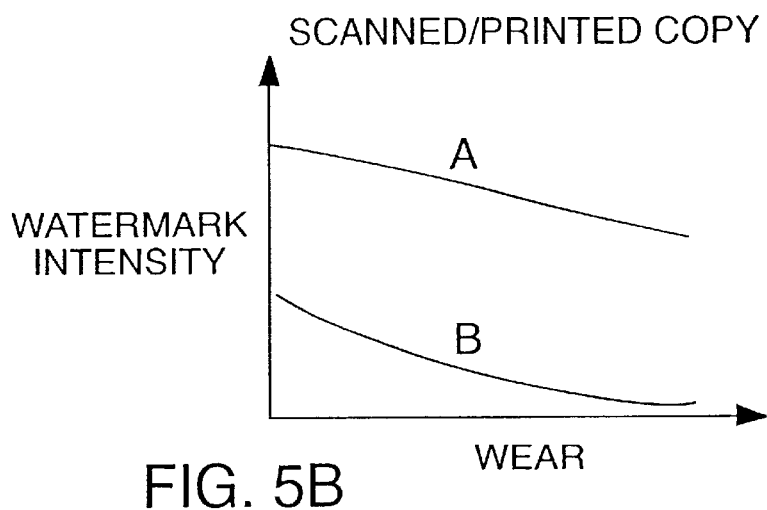

There may be cases in which the wear-based degradation to the watermarks in a worn but original document can yield results similar to the scan/print degradation to the watermarks in a crisp copy. For example, consider the case of an original document having watermarks A and B of equal energy, but tailored so that watermark B is more frail and falls-off rapidly in energy when photocopied. On finding a suspect document with a ratio of energy between the two documents in excess of 2:1 (or a commensurate difference in signal-to-noise ratios), a counterfeit may be presumed. However, this ratio may also result from extreme wear of an original document. See, e.g., the watermark strength v. wear chart of FIGS. 5A and 5B for an original document, and the same document after scanning on a 600 dpi scanner and printing on a 720 dpi printer. The original document degrades to a watermark energy ratio of 2:1 at point x. A crisp copy has the same ratio, resulting in a potential ambiguity.

To distinguish these two cases, the wear of the document can be assessed. Various means can be used to distinguish document wear. One is high frequency content, as can be determined by high pass filtering the document image data, or performing an FFT, DCT, etc. A worn document typically loses some high frequency energy. Another is contrast—a worn document typically loses contrast. Still another is color gamut—a worn document may fade to a less varied gamut. Still another is luminance—the soiling of a document can decrease the overall document brightness. Yet another is physical integrity—a worn document droops when only partially supported. Yet another means is a quick human assessment of wear, with human entry of a corresponding datum into a system (e.g., on a wear scale of 0 to 10, or simply "crisp," "used," or "very worn"). Still other means can similarly be employed.

The wear can be graded on an arbitrary scale, depending on the particular measurement means used. In an illustrative case, wear may range from 0 ("crisp") to 7(extreme). In the FIG. 5 example, the x point may be at wear value 5. In distinguishing the documents, a look-up table, microprocessor-implemented algorithm, or other arrangement can be provided that takes as its input the ratio and wear values, and produces outputs, e.g., as follows:

It is noted that while the present invention utilizes multiple watermarks with different characteristics to differentiate original documents from copies of the original, one can also utilizes multiple watermarks with different characteristics for other reasons. Documents may include multiple similar watermarks in addition to the watermarks having

|  | Wear = 0 | Wear = 1 | Wear = 2 | Wear = 3 | Wear = 4 | Wear = 5 | Wear = 6 | Wear = 7 |
| --- | --- | --- | --- | --- | --- | --- | --- | --- |
| Ratio = 1.0 | Original | Original | Original | Original | Error? | Error? | Error? | Error? |
| Ratio = 1.25 | Original | Original | Original | Original | Original | Error? | Error? | Error? |
| Ratio = 1.5 | Original | Original | Original | Original | Original | Original | Error? | Error? |
| Ratio = 1.75 | Copy | Copy | Original | Original | Original | Original | Original | Error? |
| Ratio = 2.0 | Copy | Copy | Copy | Copy | Original | Original | Original | Original |
| Ratio = 2.25 | Copy | Copy | Copy | Copy | Copy | Original | Original | Original |
| Ratio = 2.5 | Copy | Copy | Copy | Copy | Copy | Copy | Original | Original |
| Ratio = 2.75 | Copy | Copy | Copy | Copy | Copy | Copy | Original | Original |
| Ratio = 3.0 | Copy | Copy | Copy | Copy | Copy | Copy | Copy | Original |
| Ratio => 3.25 | Copy | Copy | Copy | Copy | Copy | Copy | Copy | Copy |

(The "Error?" outputs corresponds to cases that should not occur in actual practice, e.g., a very worn document in which the ratio of watermarks is 1.0.)

While four embodiments and a further enhancement of the invention have been shown herein, it should be understood that many other characteristics and attributes of a digital watermark could be used to practice the present invention in addition to the characteristics and attributes described herein. Furthermore other known digital watermarking techniques can be used together with and applied to the digital watermarks used for the present invention. It is also noted that while in the above examples only two watermarks were used; in some situations one could use three, four five or more watermarks. That is, the embodiments of the invention specifically described herein utilize two watermarks. It should be understood that any number of watermarks could be utilized in like manner. Furthermore while the embodiments shown herein utilize two separate watermarks, the two watermarks used to practice the present invention could be combined into one watermark which has a plurality of separate identifiable and measurable characteristics.

Still further, while the invention was particularly illustrated with reference to watermarking that is effected in the pixel domain, the same techniques are likewise applicable to watermarking effected in the DCT, wavelet, or other domain (e.g., as shown in U.S. Pat. No. 5,930,369). Moreover, some documents may include watermarks effected in two different domains (e.g., pixel and DCT).

Still further, the different watermarks can be of entirely different types. For example, one watermark can comprise slight alterations to the image normally printed on a document, and the second can comprise a texture formed on the document substrate, or a background weave or tint pattern—both of which convey watermark data. (Examples of texture-, weave- and tint-based watermarks are shown, e.g., in copending applications Ser. No. 09/074,034 (filed May 6, 1998), Ser. No. 09/127,502 (filed Jul. 31, 1998), Ser. No. 09/151,492 (filed Sep. 11, 1998), U.S. Pat. No. 5,850,481, and laid-open PCT publication WO 99/53428.

different characteristics according to the present invention. As used herein, the term "document" generally refers to a physical entity. However, the same methodologies can also be applied to purely digital images—e.g., to detect losses that an image has suffered through a lossy compression/decompression process such as JPEG or MPEG, color re-balancing, etc., and thereby discern something about the history of a digital image.

It will be recognized that the principles of the invention can be incorporated into an apparatus used at cash registers and other points of sale to assess the genuineness of banknotes, food stamps, coupons, and other documents. Such an apparatus can include a scanning 1D, or stationary 2D image sensor (e.g., CMOS or CCD), and a microprocessor suitably programmed to discern first and second watermarks in image data provided by the sensor (as well as wear, if desired). (In some cases, a stationary 1D sensor may be employed.) Such apparatus further includes an output device—such as a display screen, indicator light, audible tone, voice synthesizer, or equivalent device—to provide an appraisal of the document's validity based on the sensed information.

A similar apparatus can be provided for use by Customs officials at ports of entry to check merchandise tags, packaging, labels, and other printed indicia associated with clothing, purses, electronic components, software, and other readily-counterfeitable goods, to determine whether the sensed tag/package/label is an original, or a copy. While such a determination may not provide the confidence needed to seize a shipment as counterfeit, it could flag the goods as suspect and needing further inspection and/or forensic analysis.

The idea in each of the foregoing apparatuses is, of course, to provide an indication of possible non-genuineness more reliable than the typical casual and semi-casual human inspection during very fast point-of-sale transactions and other similar high traffic volume situations, where it is unrealistic to expect human observation to be efficient "flaggers" of suspect product and documents.

To provide a comprehensive disclosure without unduly lengthening this specification, applicants incorporate by reference the documents (including applications) cited above.

While the present invention has been described with respect to four specific embodiments of the invention, it should be understood that various changes in forma and detail could be made without departing from the spirit and scope of the invention. The scope of the present invention is limited only by the appended claims.

We claim:

1. A method of steganographically encoding an object with auxiliary information, characterized by adding first and second data to the object to thereby steganographically encode same, the first data having a relatively higher likelihood of withstanding a corruption operation, the second data having a relatively lower likelihood of withstanding said corruption option, wherein said corruption operation comprises compression and subsequent decompression by a lossy process.

2. The method of claim 1 that further includes performing compression and subsequent decompression operations on said object, and thereafter successfully detecting the first data but not successfully detecting the second data.

3. The method of claim 1 wherein said corruption operation comprises MPEG compression and decompression.

4. The method of claim 1 wherein the object represents a motion picture.

5. The method of claim 1 wherein the object represents audio.

6. The method of claim 1 wherein the first and second data are added at the same time.

7. The method of claim 1 wherein said object is a printed document, and the corruption operation comprises reproduction.

8. A computer storage medium having stored thereon a digital object processed in accordance with the method of claim 1.

9. A method to analyze an image of a printed object to determine whether the printed object is a copy or an original, the printed object comprising first steganographic data embedded therein and second steganographic data embedded therein, wherein the first steganographic data comprises a first characteristic and the second steganographic data comprises a second characteristic, said method comprising: machine-reading the first Steganographic data and the second steganographic data from the image to evaluate the first and second characteristics; comparing a condition of the first characteristic relative to a condition of the second characteristic; and based on said comparing step, determining whether the printed object is a copy or an original.

10. The method of claim 9, wherein the first characteristic is designed to change differently relative to the second characteristic when subjected to distortion.

11. The method of claim 10, wherein the distortion comprises a color transformation.

12. The method of claim 10, wherein the distortion comprises compression.

13. The method of claim 10, wherein the distortion comprises a print operation.

14. A method comprising:

receiving a set of sampled data;

analyzing said set of sampled data for a first watermark and a second watermark;

determining, based on a signal comparison of the first and second watermarks, whether the set of sampled data corresponds to an original, or a degraded reproduction of an original; and controlling operation of equipment in accordance with said determination, wherein the first and second watermarks are designed to change differently when subjected to distortion.

15. A method comprising:

sensing a first parameter related to a first steganographic watermark from a printed document;

sensing a second parameter related to a second steganographic watermark from the printed document; and by reference to at least a comparison of the first and second parameters, assessing whether the document is likely an original document, wherein the first and second steganographic watermarks are designed to change differently when subjected to a corruption process.

16. The method of claim 15, wherein the corruption process comprises a color transformation.

17. The method of claim 15, wherein the corruption process comprises compression.

18. The method of claim 15, wherein the corruption process comprises a print operation.

19. The method of claim 15, wherein the corruption process comprises image capture.

* * * * *